United States Patent
Cahill et al.

[11] Patent Number: 5,810,242
[45] Date of Patent: Sep. 22, 1998

[54] CONTAINER WITH CARRYING HANDLE

[75] Inventors: Michael John Cahill; David Robert Seaward, both of Coventry; Mark Geoffrey Somers, Merseyside; Geoffrey William Vernon, Wycombe, all of England

[73] Assignee: Molins PLC, Milton Keynes, United Kingdom

[21] Appl. No.: 677,681

[22] Filed: Jul. 8, 1996

[30] Foreign Application Priority Data

Jul. 8, 1995 [GB] United Kingdom .................. 95149000

[51] Int. Cl.⁶ .............................. B65D 5/475; B31B 1/86
[52] U.S. Cl. ...................... 229/117.25; 24/453; 220/416; 493/88; 493/119; 493/909
[58] Field of Search .......................... 229/117.24, 117.25, 229/117.26, 125.21, 125.37, 198, 198.1; 220/416, 418, 752, 773; 24/297, 453; 493/88, 118, 119, 384, 385, 909

[56] References Cited

U.S. PATENT DOCUMENTS

| D. 293,880 | 1/1988 | Takahashi | 24/453 |
| 687,704 | 11/1901 | Unser | 229/117.26 |
| 2,001,476 | 5/1935 | Vogt | 229/117.28 |
| 2,421,238 | 5/1947 | Borah | 229/198 |
| 3,115,225 | 12/1963 | Fraylock et al. | 24/297 |
| 3,494,244 | 2/1970 | Wayland | 24/453 |
| 3,587,699 | 6/1971 | Kovach | 229/117.26 |
| 4,776,739 | 10/1988 | Hamman | 24/297 |
| 5,050,760 | 9/1991 | Garcia | 220/773 |
| 5,265,795 | 11/1993 | Roth et al. | 229/910 |

FOREIGN PATENT DOCUMENTS

| 2261824 | 6/1974 | Germany | 24/297 |
| 821902 | 10/1959 | United Kingdom | 24/297 |
| 855945 | 12/1960 | United Kingdom | 24/453 |

*Primary Examiner*—Gary E. Elkins
*Attorney, Agent, or Firm*—Antonelli, Terry, Stout & Kraus, LLP

[57] ABSTRACT

A container, such as a cardboard carton, has a carrying handle secured by a fixing element at an attachment zone adjacent each end of the handle to opposite side walls of the container. The fixing elements each have a shaft portion transverse to the plane of respective attachment zones extending through the container wall, the shaft portion having a barb extending outwardly on the shaft and engaging with the container to retain the fixing element in position. The handle is attached to the container side walls by forcing the fixing elements through the side walls at the respective attachment zones.

17 Claims, 3 Drawing Sheets

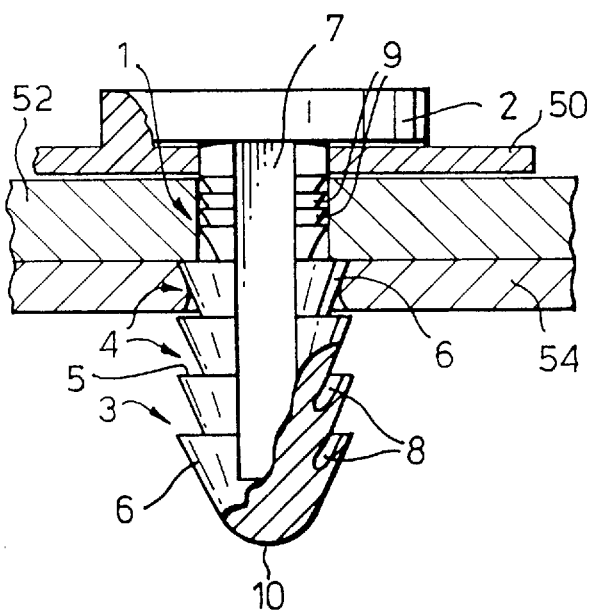
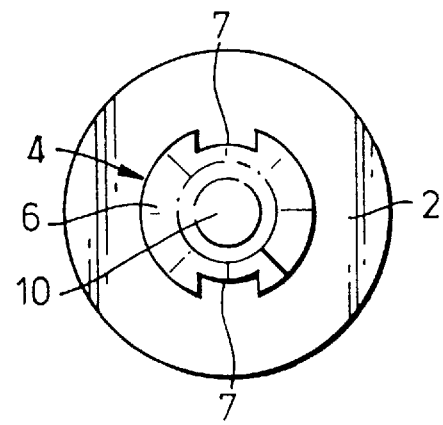
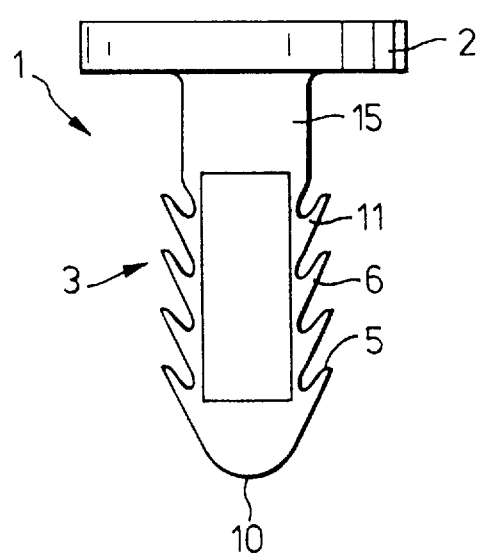
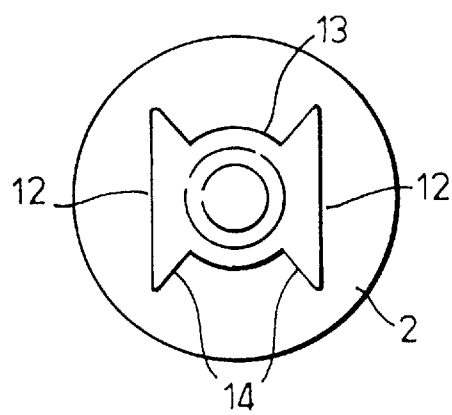

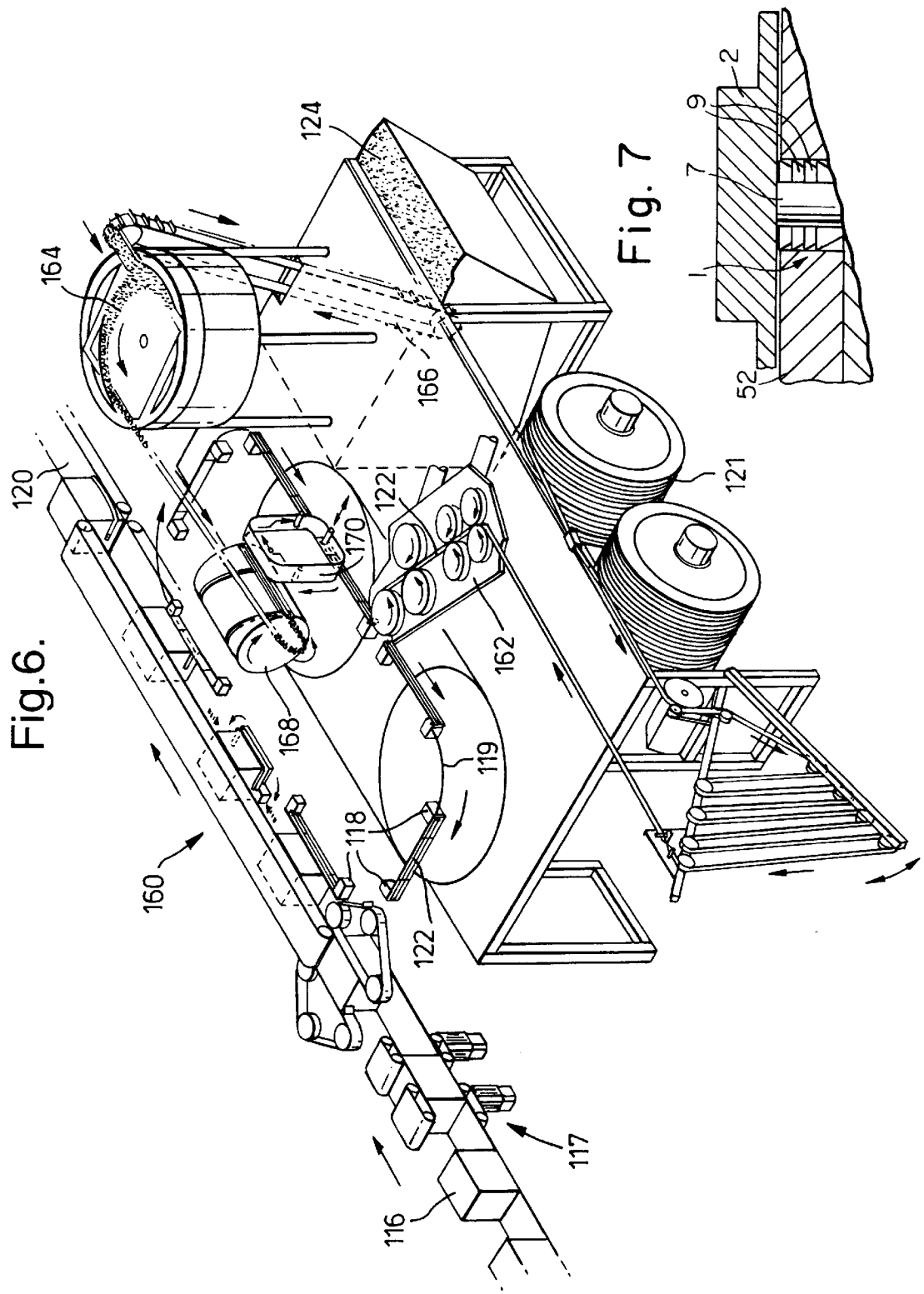

CONTAINER WITH CARRYING HANDLE

This invention relates to a container having a carrying handle and particularly to a container having a carrying handle secured at each end to opposite side walls of the container. The invention also relates to a method of attaching a carrying handle to a container, and to a fixing element for securing a carrying handle to a container. The invention is particularly but not exclusively applicable to containers such as cartons used for powdered or granular materials, e.g. washing powders.

It is well known to secure a carrying handle, usually of plastics material, to the side walls of a container by rivets. The handle can be secured either to the flat blank before it is erected to form the container or after the blank has been erected to form an open-topped container and before it is filled and closed. In both of these known methods the riveting process requires an anvil in contact with the head of the rivet and an anvil which contacts and clinches or deforms the opposite end of the rivet. Thus it is necessary to have access for anvils to both ends of the rivet. This has the disadvantage that the riveting process is slower than the process of erecting the container and filling goods such as powder or granular materials into the container which leads to either a slowing down of the filling process or the need for additional handle fixing equipment.

According to the present invention there is provided a container (e.g. a carton constructed for example from cardboard) having a carrying handle secured by a fixing element at an attachment zone at each end of the handle to opposite side walls of the container, the fixing elements each comprising a shaft position extending transverse to the plane of respective attachment zones through the container wall and having a barb extending outwardly on the shaft and engaging with the container wall to retain the fixing element in position. Because the fixing elements are retained in position by the barbs they allow the handle to be attached without the need for a clinching or deforming operation. The container can therefore be manufactured more quickly and hence more cheaply compared to a container having a conventional rivet attaching the handle to the container.

Preferably the barbs are resilient so that as the shaft portion is forced through the container wall the barb tends to collapse. This minimises the size of the hole in the container wall so that when the shaft portion comes to rest and the barb resiles to its original form a more positive grip is formed between the fixing element and the container wall. Most preferably the barbs engage with the inner surface of the container.

The fixing elements can be integrally formed together with the handle but preferably the fixing elements are formed separately and have a shaft portion which extends through holes in the attachment zones of the handle and through the container wall, the fixing elements having a head portion larger than the holes in the attachment zones and lying adjacent to the handle.

The fixing element can have more than one barb, the barbs being spaced apart from one another at different distances from the head portion. This can ensure that even if the fixing element is not fully inserted to the position in which the head portion engages the handle a barb will nevertheless retain the element in the container side wall. Further, if a fixing element is unintentionally pulled away from the fully inserted position another barb may engage the inside of the side wall and prevent that end of the handle from becoming detached. It also ensures adequate retention in the event of inward bulging of the side wall as the fixing element is inserted and allows the fixing elements to be used with different thicknesses of container side walls. The container may have an internal liner adjacent to the inside of the side wall to enhance the strength or other characteristics of the container. In this case each fixing element conveniently extends through the side wall and the liner, a first barb engaging the inside face of the container and a second barb engaging the inner surface of the liner.

The invention also provides a method of attaching a handle or the like to the side wall of a container comprising positioning at least one attachment point on the handle at a respective attachment point of the container side wall, aligning a shaft portion of a fixing element with the predetermined attachment point and moving the shaft portion of the element in a direction transverse to the container wall to force the shaft through the container wall until a barb extending outwardly on the shaft portion has engaged with the container wall to secure the handle in position. The barb is preferably resilient and passes through the container wall to engage the inside of the container.

This method of attaching the handle to the container can be automated to operate at higher speeds than a conventional riveting process because it is not necessary to move into position an anvil to clinch or deform one end of the fixing element. It can be automated to attach handles to containers at the same rate that the containers can be filled without having to reduce the through-put of the filling operation. The method is preferably carried out in a continuous process, i.e. without the travel of the container being stopped. Conveniently the attaching of the handles can be carried out as an on-line process as part of the container erection and filling line.

The handles can be of plastics material or other suitable material having sufficient strength. The or each fixing element can be formed integrally with the handle which enables the shaft portion to be relatively simply aligned with the attachment point.

Preferably there are two fixing elements and attachment points for each handle. The fixing elements may be provided separately from the handle, the attachment zones are positioned in contact with the container side walls and the fixing elements each have a head portion which abuts the handle after the fixing elements have been forced through the container walls to engage a resilient barb within the container. This allows the handles to be fed from a continuous supply reel before being cut into length immediately prior to positioning the attachment zones in contact with the container side walls. Conveniently preformed holes are provided in the attachment zone at each end of the handle having a size smaller than the size of the head portion. The shaft portions of the fixing elements are therefore aligned with the preformed holes before being forced to pass through the container side walls.

Preferably preformed holes are not provided in the container side walls thereby minimising the problems of aligning the shaft portion of the fixing elements with holes in the container and/or the handle before the fixing elements are forced through the container. Whilst it is relatively simple to align the shaft portions of the fixing elements with one preformed hole it is more difficult to do this accurately with a second preformed hole.

Clearly the ease with which the fixing elements can be forced through a container wall without preforming holes in the walls will depend upon a number of factors. Where the thickness and rigidity of the container wall is that necessary for the container to meet other physical strength criteria it has been found possible to attach handles in this way in the conventional positions using fixing elements of plastics materials. Nevertheless the exact shape and design of the fixing elements can vary according to, e.g., the nature of the container material. Where the nature of the container makes it too difficult to force the fixing elements there through a weakened area can be formed at the attachment points. The weakened area can be e.g., a cut partially or wholly through the container wall, a small hole or hole with a serrated edge. Not only does this assist the forcing of the fixing elements through the container wall but can also minimise the problem of aligning the shaft portion with the attachment point since the fixing element may tend to align itself with the weakened area.

An advantage of not providing a preformed hole on the container side walls is that as the fixing element is forced through the container there is little or none of the container material actually removed. The resilient barb or barbs tend to collapse as they pass through the container wall material to limit the size of the hole created in the container and when the fixing elements are in position the material around the hole lies in close contact with the shaft position of the fixing elements. This contact between the shaft positions and the wall material minimises a possible source of leakage of the product from the container.

The container may be a carton, i.e. having walls primarily of cardboard, or may be constructed from rigid or semi-rigid plastics material (e.g. having a thickness of not more than about 0.2 mm). The cross sectional shape of the container is not critical: it could be circular, oval, square, rectangular or any other convenient shape.

Particularly where the container is provided with a liner lying inside the side walls of the container, the fixing elements are forced through the liner to engage a barb with the inside face of the liner. Where the carton is formed from a blank, this is conveniently erected, filled and closed before the handle is attached. This avoids any difficulties in handling flat blanks to which the handles have been attached to or any difficulties in handling erected, open-topped, cartons to which the handles have been attached. More generally, the rigidity of a container once it has been filled and closed is increased thereby facilitating the step of forcing the fixing elements through the container side wall which is particularly advantageous when no preformed hole or weakened area is provided in the container.

The invention also extends to a fixing element, particularly but not exclusively intended for securing a carrying handle to a container at an attachment zone of a wall of the container, comprising a head portion and a shaft portion, a plurality of barbs longitudinally spaced on the shaft, and at least one longitudinal groove extending through the barbs, said groove terminating short of the end of the shaft remote from the head portion.

The invention will be further described, by way of example only, with reference to the accompanying diagrammatic drawings in which:

FIG. 1 is a side elevation of a fixing element shown partly in section;

FIG. 2 is an end view of the fixing element of FIG. 1;

FIG. 3 is as side elevation of an alternative form of fixing element;

FIG. 4 is an end view of the fixing element of FIG. 3;

FIG. 6 is a perspective view of another machine for attaching handles to cartons; and FIG. 7 is a side elevational of another form of a fixing element shown partly in section.

Figure 5:
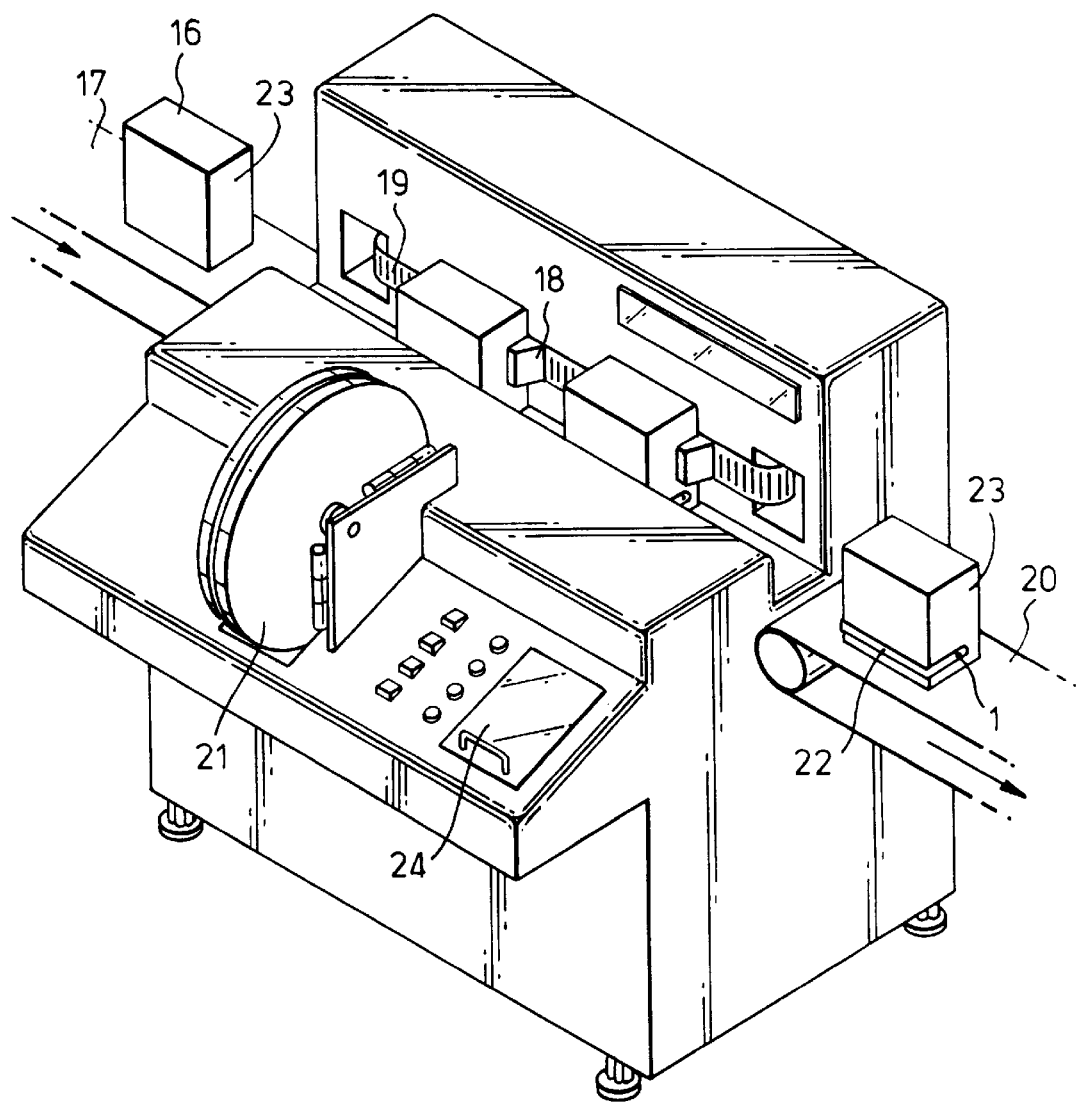
FIG. 5 is a perspective view of a machine for attaching handles to cartons.

The fixing element 1 shown in FIG. 1 can be of plastics material such as nylon or polypropylene and has a head portion 2 and a shaft portion 3. The shaft portion is provided with resilient barbs 4 having rear abutment faces 5 at right angles to the longitudinal axis of the shaft and inclined front faces 6 facing away from the head portion. The barbs are arranged in four places spaced apart from one another at different distances from the head portion. As seen more clearly in FIG. 2 two diametrically opposite longitudinal grooves 7 are formed along the shaft portion 3 so that there are in effect two barbs in each transverse plane, the grooves 7 extending to the underside of the head 2 and terminating short of the opposite end of the shaft portion.

The sectioned part of FIG. 1 shows that the rear abutment faces 5 extend around the peripheries of the barbs with recesses 8 extending into the barbs. Thus the barbs are flexible to allow a degree of flexing inwards towards the shaft.

A series of smaller annular ribs 9 are formed on the shaft adjacent the head portion.

The end of the shaft is rounded at 10: thus, it does not present a sharp edge inside the carton yet still facilitates forcing of the fixing element through the carton wall without removing carton material or unduly damaging the carton material.

As shown in FIG. 1, the fixing element 1 is shown in place connecting a handle 50 to a carton side wall 52. The ribs 9 engage a hole in the side wall and an abutment face 5 of a barb 4 engages the inner face of the wall 52. The abutment face 5 of another barb 4 engages the inner face of a liner 54 provided for the carton side wall 52. The head 2 could be formed integrally with the handle 50, as shown in FIG. 7.

FIGS. 3 and 4 show an alternative construction of fixing element 1 having a head portion 2 and a shaft portion 3 as before. The shaft portion is provided with resilient barbs 11 which are again spaced from one another in four transverse planes at different distances from the head portion.

As seen in FIG. 4 the peripheries of the barbs in this embodiment are straight edges 12 separated by a groove 13 having inclined side edges 14. The grooves 13 do not extend to the underside of the head as in the embodiment of FIGS. 1 and 2, thus leaving a cylindrical shaft 15 between the head and the adjacent barb 11. The other ends of the grooves again terminate short of the opposite end of the shaft. The barbs each have rear abutment faces 5 and inclined front faces 6 as before and a rounded end 10. As shown in this embodiment the annular ribs 9 are omitted.

Referring now to FIG. 5 there is shown the general layout of a machine for attaching a handle to a carton which may be of the type having a coating of plastics material at least on the inside. The machine may conveniently form part of a filling and closing machine.

After having been filled and closed, cartons 16 are fed to the machine by a conveyor belt 17. In the machine the cartons are engaged by jaws 18 attached to a feed belt 19 so that the cartons are passed through the machine at positively defined intervals. After having passed through the machine the cartons are discharged onto a further conveyor 20.

A continuous length of plastics handle material is contained on a reel 21 rotatably mounted on the machine. A predetermined length of the plastics material is cut from the reel 21 to form a handle 22 and attachment zones at the ends thereof are brought into contact with the side walls 23 of the carton 16. The plastics material on the reel can be provided with holes at the desired spacings for the fixing means. Alternatively the holes may be preformed in the machine after it is taken from the reel.

Fixing elements 1 are automatically fed from a bulk hopper 24 and the shaft portion 3 of an element is brought into alignment with each of the preformed holes in the handle and forced, e.g by mechanical or pneumatic means, through the preformed holes in the handle and through the carton side walls 23 until the head portion 2 contacts the handle. The fixing elements each puncture a hole in the side walls and as the barbs pass through the handle and the side walls the barbs flex inwards towards the shaft. When the fixing elements 1 are fully inserted with the head portion in contact with the handle the barbs resile to their original shape and the abutment surfaces 5 of one of the barbs engages the inner surface of the side walls 23 to retain the elements in position. If the carton has an internal liner a second barb can engage with the inside of the liner. Where the liner is of corrugated board material a barb may engage within the thickness of the liner. The cardboard material surrounding the holes in the side walls engages with the ribs 9 (when provided) or the shaft portion adjacent the head to substantially seal against any leakage of product from the cartons.

The machine shown in FIG. 6 forms part of a carton filling and closing machine for cartons 116. A series of feed conveyors 117 feed the cartons 116 past a position 160 at which successive cartons are engaged by jaws 118 each comprising a pneumatic or mechanical inserter for attaching a handle 122 to each carton, the jaws being carried at spaced intervals on an endless conveyor 119. Cartons 116 with handles 122 attached are discharged onto a delivery conveyor 120.

Plastics handle material is fed in web form from a reel 121 and cut to form individual handles 122 by a handle cutting device 162. Each handle 122 is received on the conveyor 119 so that it extends between cooperating successive jaws 118.

Fixing elements 1 are fed from a bulk hopper 124 to a rotary feeder 164 by way of a vertical elevator 166. A line of fixing elements is delivered from the rotary feeder 164 to an escapement device 168 and transfer mechanism 170 which delivers individual fixing elements to each jaw 118.

The conveyor 119 transports successive pairs of jaws 118 to the position 160, at which the jaws are rotated as indicated in FIG. 6 and the inserter actuated to attach the handle to the carton 116 in the same way as the handles 22 are attached to the carton 16 in the embodiment of FIG. 5.

It will be appreciated that although the invention has been described with reference to the attaching of handles to filled and closed cartons the invention can also be used to apply handles to other containers or to flat blanks or to erected cartons or containers before they are filled.

We claim:

1. A container having an internal liner adjacent to the inside surface of the side walls of the container and a carrying handle secured by fixing elements at respective attachment zones adjacent each end of the handle to opposite ones of said side walls, the fixing elements each comprising a shaft portion extending transverse to the plane of a respective attachment zone and through the handle at the attachment zone and through the container wall, each fixing element having a plurality of barbs spaced apart from one another along a longitudinal axis of the shaft portion and extending outwardly on the shaft portion, the shaft portion of each fixing element extending through a side wall of said internal liner with a first barb thereof engaging the inside surface of the container and a second barb engaging with said internal liner to retain the fixing element in position.

2. A container according to claim 1 in which the barbs on each fixing element are resilient.

3. A container according to claim 1 in which some of said barbs on each fixing element are smaller in diameter than said first and second barbs and engage the inner surface of the opening in said container through which the shaft portion of the fixing element extends.

4. A container according to claim 1 in which the fixing elements are integral with the handle.

5. A container according to claim 1 in which the shaft portions of the fixing elements extend through holes in said respective attachment zones of said handle, the fixing elements each having a head portion larger than said holes in the attachment zones and lying adjacent said handle.

6. A container according to claim 1 in which said second barb engages with the inner surface of said internal liner.

7. A container according to claim 1 in which the shaft portion of each fixing element is provided with one or more ridges contacted by a side wall of the container.

8. A method of attaching a handle to the side walls of a container using at least one fixing element having a head portion and a shaft portion attached to said head portion, which shaft portion has at least one barb extending outwardly therefrom, said method comprising the steps of positioning at least one attachment point on the handle at a respective attachment point of a side wall of the container, aligning a shaft portion of a fixing element with said handle attachment point and moving the shaft portion of the fixing element in a direction transverse to the container side wall to force the shaft portion through the handle and the container side wall until said head portion abuts the handle and a barb extending outwardly on the shaft portion has engaged with the container side wall to secure the handle in position, wherein the shaft portion of said fixing element creates an aperture in said side wall of said container as said shaft portion thereof is forced through said side wall.

9. A method according to claim 8 in which the barb is resilient, the barb passing through the container wall and engaging with the inside of the container.

10. A method according to claim 8, in which the attachment point of the handle is positioned in contact with the container side wall prior to the fixing element being forced through the container side wall to engage said barb within the container.

11. A method according to claim 10, in which the attachment zone of the handle is provided with a preformed hole having a size smaller than the size of the head portion.

12. A method according to claim 8, in which the container is erected from a flat blank, filled and closed prior to attaching the handle.

13. A method according to claim 8 in which a weakened area is formed in the container wall at the attachment point.

14. A method according to claim 8 in which similar attachment points are provided at each end of the handle.

15. A method of attaching a handle to the side walls of a container, comprising the steps of positioning at least one attachment point on the handle at a respective attachment point of a side wall of the container, aligning a shaft portion of a fixing element with said handle attachment point and moving the shaft portion of the fixing element in a direction transverse to the container side wall to force the shaft portion through the container side wall until a barb extending outwardly on the shaft portion has engaged with the container side wall to secure the handle in position, in which the container is provided with a liner lying inside the side walls of the container, each fixing element being forced through the liner to engage said barb of the fixing element with the liner.

16. A fixing element, particularly for securing a carrying handle to container at an attachment zone of a wall of the container, comprising a head portion and a shaft portion having longitudinal axis, a plurality of barbs longitudinally spaced on the shaft portion with radially outer peripheries having straight edges lying in parallel planes on opposite sides of the longitudinal axis of the shaft portion, and at least one longitudinal groove extending through the barbs, said groove terminating short of the end of the shaft portion remote from the head portion.

17. A fixing element according to claim 16 in which the groove has inclined side edges.

* * * * *